March 11, 1969     A. J. GIRARD     3,432,241
RADIATION GATE FOR SPECTROMETRIC APPARATUS
Filed March 4, 1965     Sheet 1 of 8

INVENTOR.
ANDRÉ JEAN GIRARD
BY
Karl F. Ross
Attorney

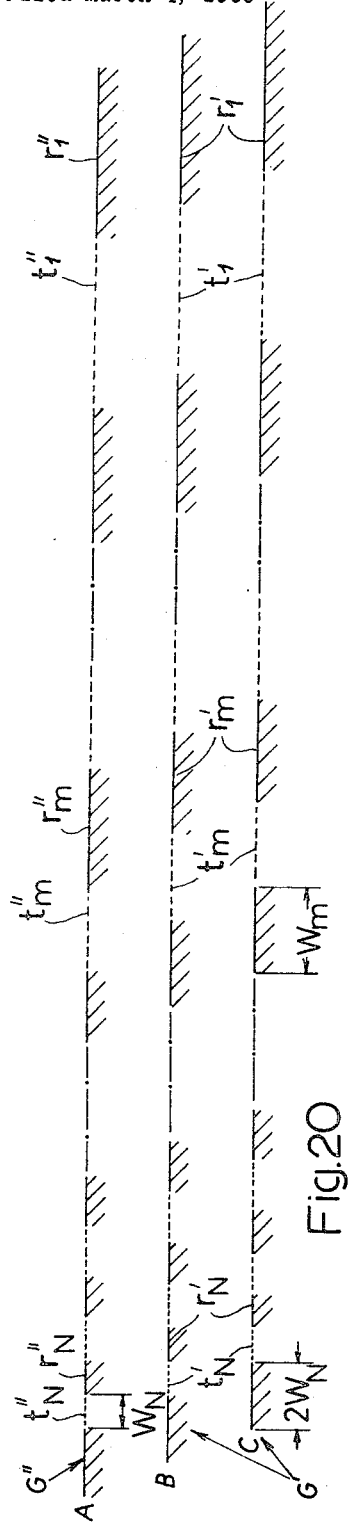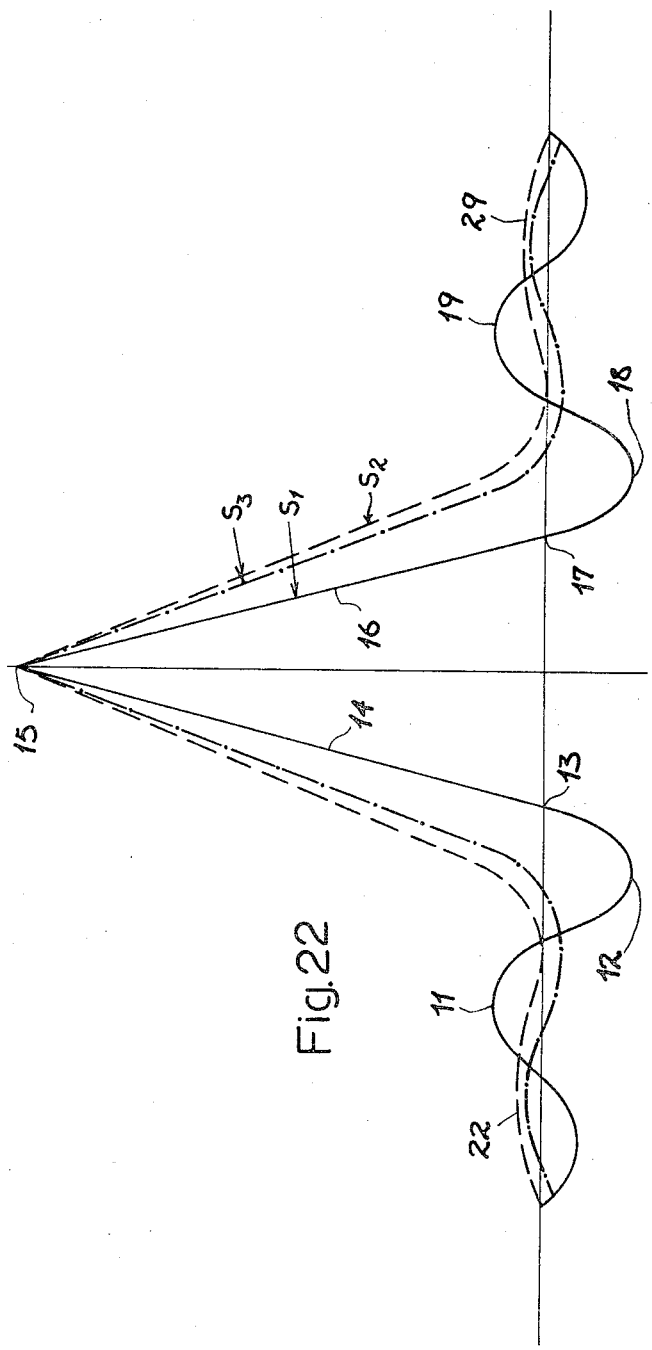

United States Patent Office 3,432,241
Patented Mar. 11, 1969

1

3,432,241
RADIATION GATE FOR SPECTROMETRIC
APPARATUS
André Jean Girard, Chatillon-sous-Bagneux, France, assignor to Office of National d'Etudes et de Recherches Aerospatiales, Chatillon-sous-Bagneux, France, a corporation of France
Continuation-in-part of application Ser. No. 31,690, May 25, 1960. This application Mar. 4, 1965, Ser. No. 437,088
U.S. Cl. 356—99  25 Claims
Int. Cl. G01j 3/14

ABSTRACT OF THE DISCLOSURE

Radiation gate for spectrometric apparatus of the type wherein two such gates are disposed on opposite sides of a prism to project the image of the input gate upon the output gate in exactly registering relationship in the presence of monochromatic radiation of predetermined frequency; the device includes one or more rows of alternately transmissive (i.e. transparent or reflecting) and nontransmissive (i.e. opaque or nonreflecting) zones whose widths in the direction of succession vary progressively according to a generally hyperbolic law.

---

This application is a continuation-in-part of my copending application Ser. No. 31,690 filed May 25, 1960, now Patent No. 3,211,048.

My present invention relates to a device adapted to be used as a radiation gate in a spectrometric apparatus of the type disclosed in my above-identified copending application and patent.

The general object of this invention is to provide a device which can be used as an input or output element of such spectrometric apparatus and, when so employed in combination with one or two geometrically similar and optical identical and/or complementary devices at the opposite end of the apparatus, will produce a sharp peak in throughput for a radiation of a specific wavelength traversing an intervening projection system in such manner that an image of the input element is cast in exact registry upon the output element.

A related object is to provide a device of this character which affords not only a high degree of selectivity but also a considerably increased luminosity—and therefore sensitivity—compared with conventional split spectrometers.

The foregoing objects are realized, in accordance with my instant invention, by the provision of a device comprising a plane plate which is formed with zones belonging alternately to a first and a second multiplicity of series which differ from each other in their transmissivity for incident radiation. Thus, the zones of one series may be relatively transparent while those of the second series are relatively opaque to visible light or other incident radiation, or the zones of one series may reflect such radiation whereas the zones of the other series are substantially nonreflective while being either transparent or opaque. These zones form a pattern so related to a family of imaginary lines parallel to a predetermined direction (which may, but need not, coincide with one of the sides of the outline of the plate) that the boundaries between adjacent zones subdivide each such line into segments varying progressively in length from the ends of the line inwardly, the variation remaining monotonous, (i.e., with either positive or negative increments) from one end to the other or reversing in sign at some intermediate point. The spacing of these boundaries is so chosen that the pattern is nonrepetitive in the aforementioned direction, the total surface area of one set of zones being preferably equal

2 or nearly equal to that of the other set of zones. In this way, for any position of a prism, diffraction grating or other dispersion means forming part of the intervening dispersive system, there will be just one wavelength (hereinafter referred to as the adjustment wavelength) for which the image of the pattern of the input gate will precisely coincide, geometrically speaking, with the pattern of the output gate. Depending on whether the two patterns are optically identical or complementary, the radiation throughput (i.e., the ratio of outgoing radiation to incident radiation) will be a maximum or a minimum (generally zero) for the adjustment wavelength; upon even a slight change in wavelength, or a slight shift of the dispersion system resulting in a displacement of the image of the input-gate pattern in the direction of nonrepetitiveness of the output-gate pattern, this throughput will either drop or rise sharply, thus defining a distinct peak detectable by a radiation receiver positioned for illumination via the output gate. Upon alternation between the two types of pattern (identical and complementary), therefore, the difference in throughput is substantially the full maximum for the adjustment wavelength but becomes almost negligble with even a minor change in the wavelength of the incident radiation or a slight displacement of the dispersion system from its adjustment position; a plot of this difference exhibits an even sharper peak than a curve representing absolute throughput with one or the other type of pattern.

The invention will be described in greater detail hereafter, reference being made to the accompanying drawing in which.

Figure 1:
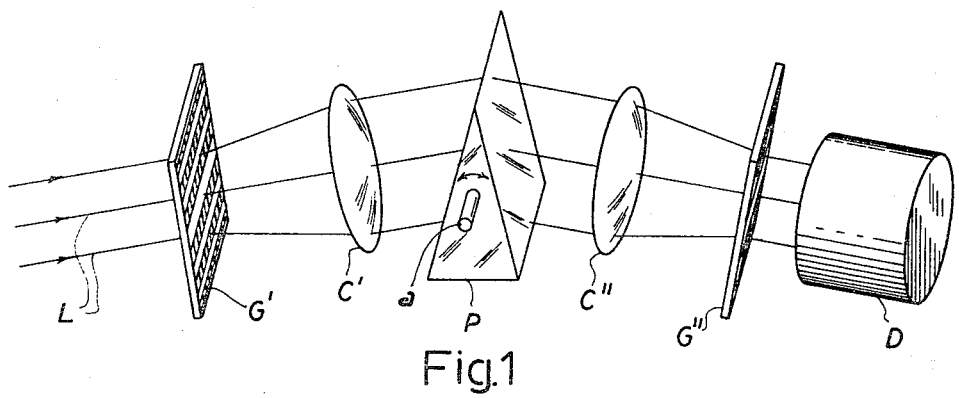
FIG. 1 is a schematic perspective representation of a spectrometer provided with a pair of radiation gates according to the invention.
Figure 3:
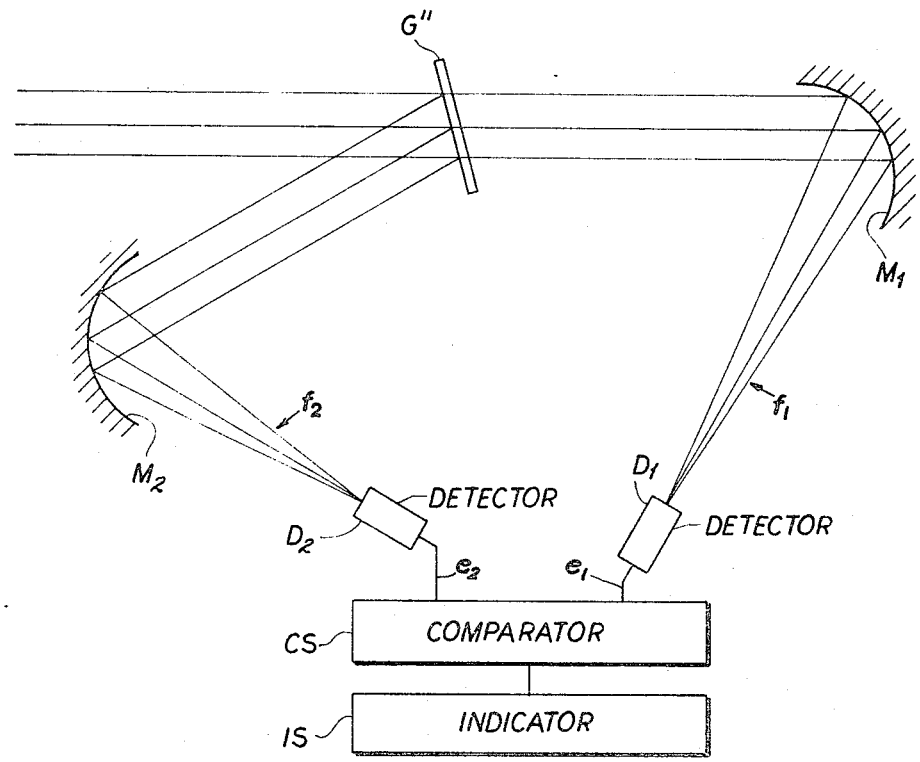
Figure 2:
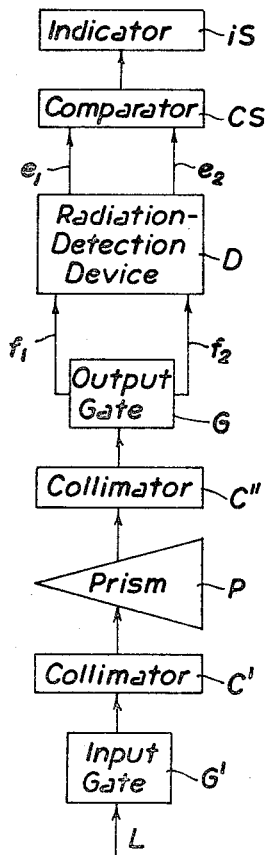
FIG. 2 is a block diagram of a spectrometer as shown in FIG. 1 but with additional elements in its output stage.
Figure 4:
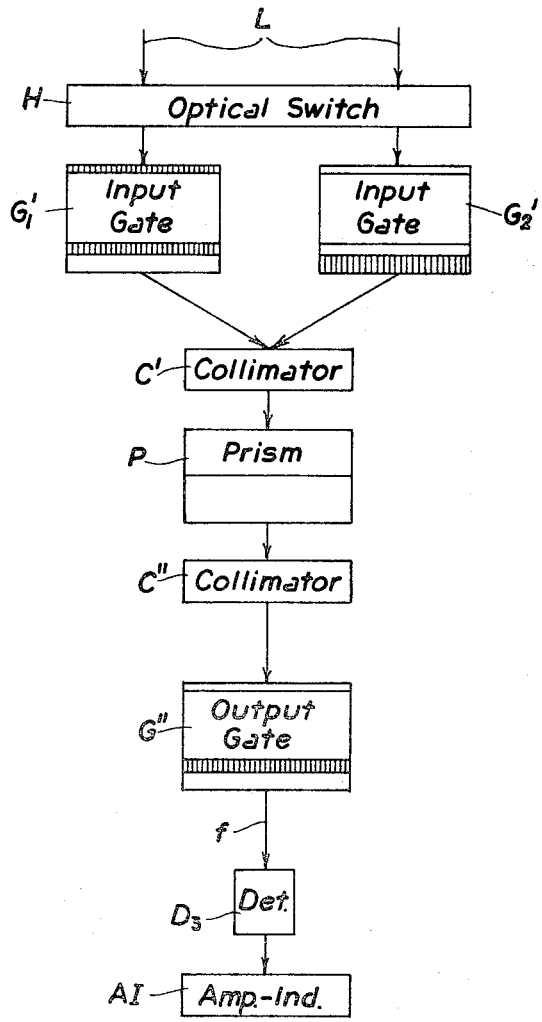
Figure 5:
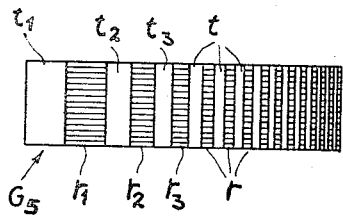
Figure 16:
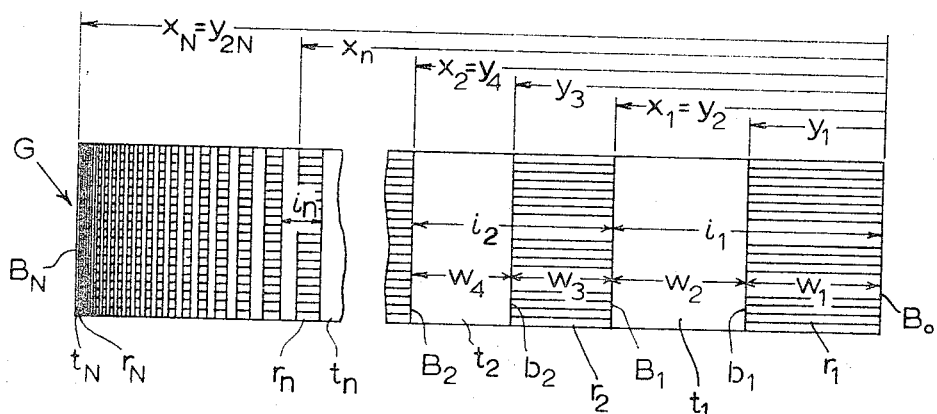
Figure 17:
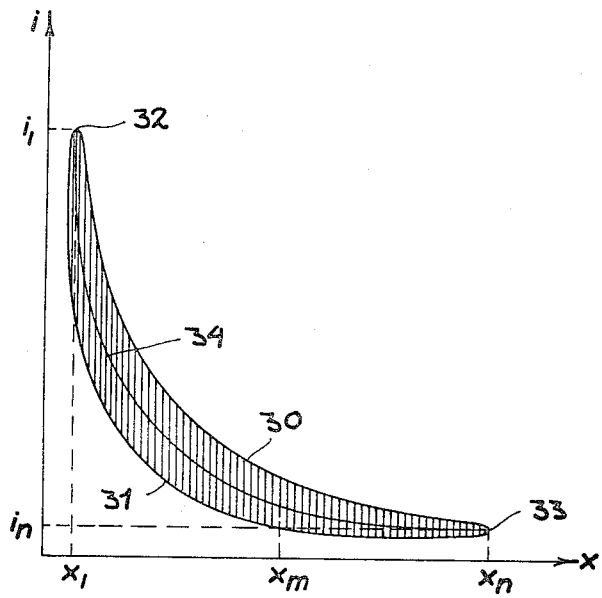
Figure 25:
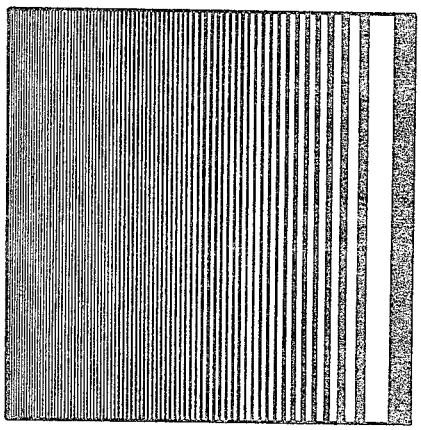
Figure 18:
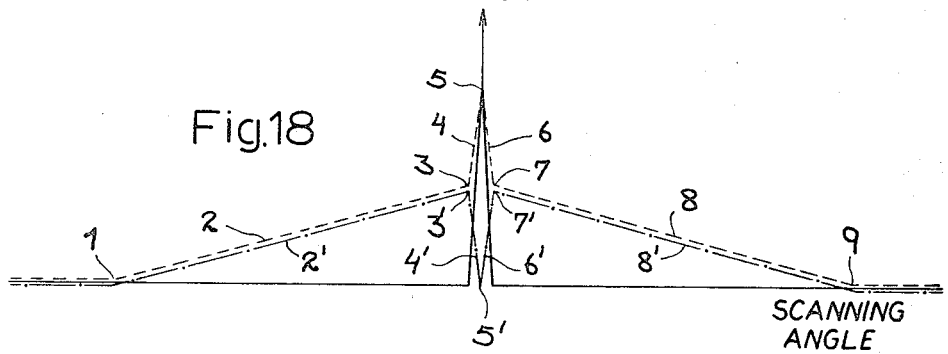
Figure 19:
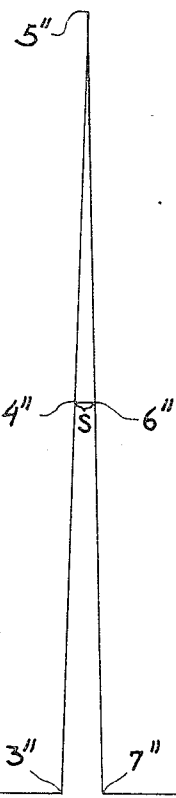
Figure 21:
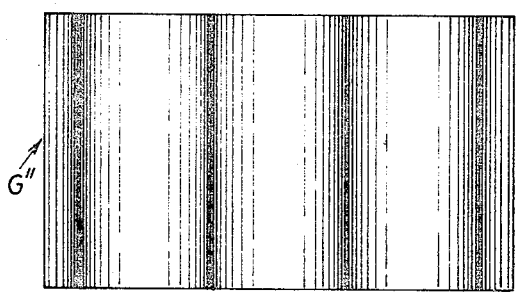
Figure 23:
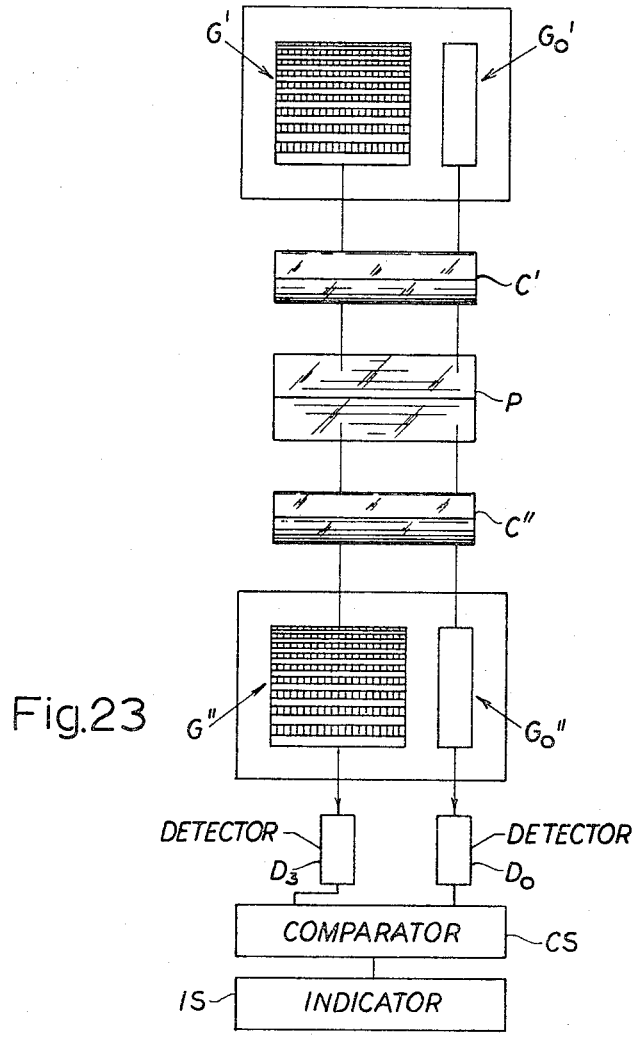
Figure 24:
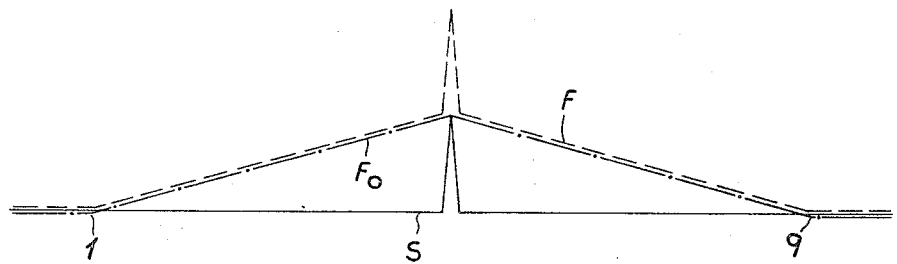

FIG. 3 diagrammatically illustrates details of the output stage shown in FIG. 2;

FIG. 4 is a block diagram of another spectrometer according to the invention, provided with a modified input stage;

FIGS. 5–15 show a variety of different patterns adapted to be used on the radiation gates of FIGS. 1–4;

FIG. 16 is an enlarged fragmentary representation of a pattern of the type shown in FIG. 5;

FIG. 17 is a graph designed to help explain the distribution of zones in a pattern such as that shown in FIG. 16;

FIG. 18 is a graph showing the amount of radiant flux impinging upon each of two radiation receivers which form part of the system of FIG. 3;

FIG. 19 is a graph of an output signal produced by the spectrometers of FIGS. 1–4 for different positions of their dispersion systems;

FIG. 20 schematically illustrates the juxtaposition of several patterns of the type shown in FIG. 16;

FIG. 21 is a face view of an output gate with the image of an input gate superimposed upon it, illustrating the illuminated and dark areas thereof in a certain position of the associated dispersion system;

FIG. 22 is a graph generally similar to that of FIG. 19, showing a series of output signals as produced by the apparatus of FIGS. 1–3;

FIG. 23 is a schematic view of an apparatus similar to that of FIGS. 1–3 but with modified radiation gates;

FIG. 24 is a graph similar to that of FIG. 19, relating to the apparatus of FIG. 23; and FIG. 25 is a pictorial representation of a zonal pattern of the general type shown in FIG. 5.

In FIG. 1 I have shown diagrammatically a spectrometer incorporating a pair of radiation gates according to my invention, this apparatus comprising an input gate G', an output gate G", a projection system between these gates including a first collimator C', a second collimator C" and a prism P therebetween, and a radiation-detection device D positioned to receive the output of the apparatus as passed by the second gate G".

These elements have also been illustrated in FIG. 2 which additionally shows the paths of a first radiation flux $f_1$ and a second radiation flux $f_2$ in the output of gate G". At $e_1$ and $e_2$ I have indicated the paths over which energy respectively derived from fluxes $f_1$ and $f_2$ is transmitted from detection device D to a comparator stage CS, the resulting difference signal being displayed by an indicator stage IS.

In FIG. 3, where the device D of FIG. 2 has been replaced by two individual detectors $D_1$ and $D_2$ for the fluxes $f_1$ and $f_2$, respectively, it has been assumed that the output gate G" has a series of transparent zones alternating with a series of reflecting zones; the associated input gate G', not shown in FIG. 3, may in this case have a series of transparent zones interleaved with a series of nonreflective opaque zones. With the plate constituting the gate G" deviating slightly from a plane perpendicular to the optical axis of the system, rays passing the transparent zones of this gate are directed by a mirror $M_1$ onto detector $D_1$ whereas rays striking the reflecting zones thereof are directed by a second mirror $M_2$ onto detector $D_2$. The patterns formed by the zones of gates G' and G" are geometrically similar, their dimensions differing only to the extent that the magnification ratio of the projection system C', C" departs from unity; thus, if this ratio is 1:1 the corresponding zones of the two patterns will be of the same size.

We shall now assume that light rays L, representative of an incident flux of monochromatic radiation, strike the input gate G' (FIGS. 1 and 2) perpendicularly so that a part of these rays, i.e., those which impinge upon transparent zones, continue toward the output gate G" by way of the collimators C', C" and the dispersion member P. Let us further assume that this member P is so positioned as to direct these rays, after dispersion, onto the output gate G" in such manner that the image of gate G' is precisely focused upon gate G" to register with the pattern of the latter. If the two gates G', G" may be considered optically identical, in the sense that the images of radiation-transmissive (i.e., transparent) zones of gate G' register with similarly transmissive zones of gate G", as well as optically complementary, in the sense that the images of nontransmissive (i.e., opaque) input-gate zones register with transmissive (i.e., reflecting) output-gate zones, the light rays passed by the input gate G' will also freely traverse the output gate G" since they will all impinge upon transparent zones thereof. Thus, with a system as shown in FIG. 3, the amount of radiation $f_1$ delivered by the receiver $D_1$ is a maximum, equal to substantially half the amount of incident radiation, if the total surface area in the transparent zones of each gate equals that of the opaque zones thereof. The wavelength for which this is true, i.e., the adjustment wavelength $\lambda_0$ of the apparatus, is defined with a degree of sharpness which varies inversely with the effective slit width of the gate pattern which in turn is determined by the with of the narrowest zone. For best results, the number of zones in the pattern should be very large, preferably at least on the order of 100, and the width ratio between the broadest and the narrowest zone should also be high, advantageously on the order of 100:1 or higher. A minor displacement of the image of the input gate relative to the output gate, as brought about by a swinging of prism P about its pivotal axis $a$ (FIG. 1) and/or a departure of the wavelength of the incident radiation L from the adjustment wavelength, will then result in a sharp reduction in throughput as seen by the detector $D_1$, i.e. in the ratio of outgoing flux $f_1$ to incident radiation L, this reduction being substantially 50% as compared with the maximum throughput registered when the image of gate G' is precisely focused on gate G". At the same time, as a result of such displacement, rays of light traversing the input gate G' will reach the reflecting zones of output gate G" and the intensity of the flux $f_2$ arriving at detector $D_2$ will rise rapidly from a minimum value of zero (for the adjustment wavelength) to a value corresponding to about half the maximum throughput, the fluxes $f_1$, $f_2$ being thus approximately equal at this point. The difference signal registered by indicator IS, accordingly, varies very sharply from a peak value for the adjustment wavelength to a value of substantially zero for slightly deviating wavelengths or prism positions. With greater deviations, and consequently larger displacement of the projected input-gate pattern relative to the output-gate pattern, the detectors $D_1$ and $D_2$ receive progressively lesser amounts of radiation which, however, continue substantially to balance each other as the flux intensity diminishes very slowly to a vanishing point at the instant when the two patterns move completely out of registry.

FIG. 4 is a schematic representation of a spectrometer according to my invention incorporating a modified radiation-gate arrangement, this apparatus comprising a first input gate $G'_1$, similar for instance to the input gate G' of the apparatus according to FIG. 1, and a second input gate $G'_2$ geometrically identical with gate $G'_1$ but complementary to the latter from the optical point of view, i.e., with zones whose transmissivity (transparency or opacity) is the converse of that of corresponding zones of gate $G'_1$. An optical switch H, such as a rotary shutter, directs the incident rays L alternately toward $G'_1$ and toward gate $G'_2$, so that collimator C' receives two radiations coming alternately from gate $G'_1$ and from gate $G_2$. Therefore, output gate G" (whose pattern is the same as that of either input gate) alternately has projected upon it an image of the input gate $G'_1$ and an image of the input gate $G'_2$. A single detector $D_3$ which receives, via a single flux path $f$, the radiation delivered by output gate G" is followed by an A-C amplifier and indicator AI tuned to a frequency corresponding to the frequency of commutation of switch H.

I shall now describe a variety of specific patterns adapted to be used for either the radiation gates G' (or $G'_1$, $G'_2$), G" of the spectrometers shown in FIGS 1–4, these spectrometers being merely representative of numerous types of apparatus (some of them disclosed in detail in my aforementioned copending application Ser. No. 31,690) to which the invention is applicable and which may utilize patterns of transparent, opaque and/or reflective zones.

In FIG. 5 I have shown a gate $G_5$ comprising a supporting plate of elongated rectangular shape whose surface is subdivided into a multiplicity of transparent or radiation-transmitting zones $t$ alternating with a multiplicity of opaque or radiation-rejecting zones $r$. The boundaries of these zones extend parallel to the minor sides of the rectangle and are progressively more closely spaced, proceeding from left to right, so as to define a transparent zone $t_1$ of maximum width at the extreme left, an opaque zone $r_1$ of maximum width next to it, and further zones $t_2$, $t_3$ etc. as well as $r_2$, $r_3$ etc. of progressively decreasing width; the direction of the straight lines which are cut by the zone boundaries along segments of progressively varying length is here the direction of the major sides of the rectangle. Whether the outermost zone at either end is transparent or opaque is not critical. It should be noted, however, that adjacent zones of different transmissivity, such as zones $t_1$ and $r_1$ or $t_2$ and $r_2$, are of substantially the same width so that the total area of transparent zones $t$ substantially equals the total area of opaque zones $r$.

Figure 6:
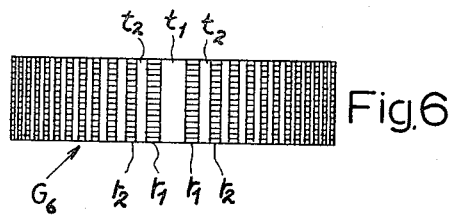
Figure 7:
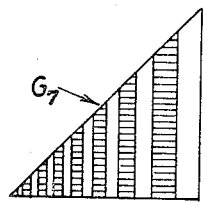
Figure 8:
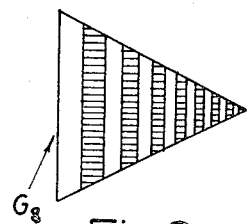

FIG. 6 shows a gate $G_6$ which is generally similar to gate $G_5$ in FIG. 5 and may be regarded as derived from the latter by a splicing of gate $G_5$ onto a mirror image thereof. The gridlike pattern of gate $G_6$ thus includes a central zone $t_1$ of a width which is double that of the corresponding zone in FIG. 5, flanked by a pair of zones $r_1$ each of the same width as in FIG. 5, and further zones $t_2$, $r_2$ etc. of progressively decreasing width symmetrically duplicated on both sides of the central zone. In this instance a monotonous (increasing or decreasing) variation in zone width, and therefore in the length of the line segments intercepted by the zone boundaries, exists from either end of the pattern to the center where a change in sign occurs, i.e., a shift from positive to negative increments.

Figure 11:
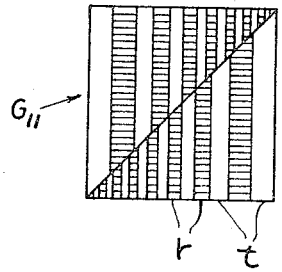
Figure 12:
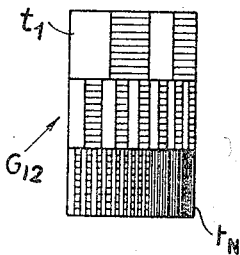

The progressive decrease in the area of successive zones, brought about by the increasingly closer spacing of their mutual boundaries, can be accentuated through replacement of the rectangular configuration of FIGS. 5 and 6 by a contour with longitudinal side edges converging toward the region of the narrower zones. Alternative embodiments of such gates have been shown in FIG. 7 as a gate $G_7$ having the shape of a right triangle and in FIG. 8 as a gate $G_8$ having the shape of an isosceles triangle; in FIG. 9 as a gate $G_9$ of rhomboidal configuration, composed as it were of two mirror-symmetrical triangular gates of the type shown in FIG. 8; and in FIG. 10 as a trapezoidal gate $G_{10}$. FIG. 11 shows another rectangular gate $G_{11}$ whose pattern is divided into two triangular rows or zones $t$, $r$ and $t'$, $r'$ adjoining each other along a common boundary line which defines one of the diagonals of the rectangle, the two patterns being mutually dissimilar in that the width of zones $t$, $r$ decreases from right to left whereas that of zones $t'$, $r'$ decreases from left to right. In FIG. 12 there is shown another gate $G_{12}$ with a multirow pattern which may be considered as derived from the pattern of gate $G_5$ (FIG. 5) by cutting the single row of zones thereof into three sections of equal lengths and juxtaposing them with one another, starting with zone $t_1$ in the top row and ending with zone $r_N$ in the bottom row; thus, the narrowest zone of the top row (right) has a width substantially equaling that of the widest zone (left) of the middle row whose narrowest zone (right), in turn, is approximately as wide as the widest zone (right) of the bottom row.

Figure 13:
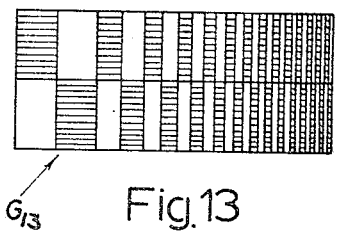

FIG. 13 represents a gate $G_{13}$ with two juxtaposed rows which are geometrically identical but optically complementary, a transparent zone of one row lying adjacent an opaque zone of the other row and vice versa.

Figure 14:
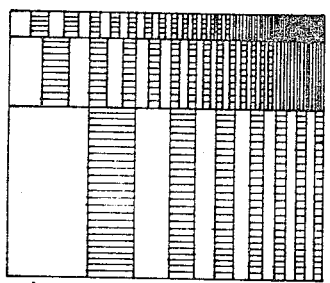

FIG. 14 shows a gate $G_{14}$ whose pattern is composed of three rows differing from those of gate $G_{12}$ (FIG. 12) in two major respects. In the first place, the height of the zones of the three rows of gate $G_{14}$ decreases progressively from the bottom row to the top row. Secondly, the distribution of zones in the two relatively narrow upper rows is harmonically related to that in the wide bottom row so that each individual zone of the bottom row registers with three zones of the middle row and with five zones of the top row, the separation of the zone boundaries within each row following, however, the same nonlinear law more fully described hereinafter. It will be noted that the combined height of the two upper rows is less than the height of the lower row so that the latter extends past the median line of the overall pattern, it being thus possible to obtain registery between zones of equal width even if the image of the input gate is projected upon the output gate in laterally reversed position. Such lateral reversal, which substantially limits the region of passage for radiation of wavelength $\lambda_o$ to a median longitudinal strip of the output gate, has been found effective in reducing the occurrence of secondary peaks in spectrometer throughput for radiation other than the adjustment wavelength. This has been first disclosed in my copending application Ser. No. 186,812, filed Apr. 11, 1962, now Patent No. 3,211,015, which also shows gate patterns similar to those of FIGS. 12–14 described above. It will be understood that the number of rows in gates $G_{12}$ and $G_{14}$ is not limited to three.

Figure 15:
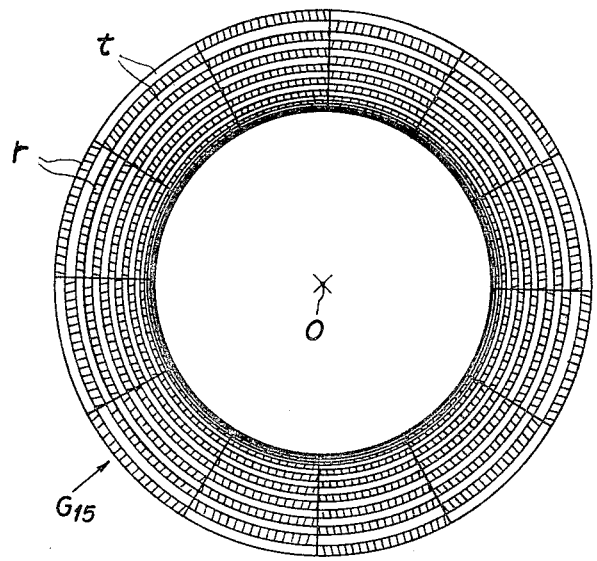

In FIG. 15 I have shown another type of Gate $G_{15}$ whose supporting plate is of annular configuration centered on a point $0$, the pattern of this gate being divided into an even number of ring segments each constituted by a succession of transparent and opaque zones $t$, $r$ which, however, are not straight and rectangular as in the preceding embodiments but are curved and bounded by circular arcs centered on $0$. These zone decrease in width toward the center $0$ and are so arrayed that a transparent zone in one segment is bracketed by opaque zones in adjoining segments. In operation, gate $G_{15}$ at either the input or the output of a spectrometer may rotate about its axis $O$ so that the input-gate image registers alternately with optically identical and optically complementary output-gate patterns. Such spectrometric analysis by alternating rather than concurrent transmission of partial fluxes over complementary paths, already described with reference to FIG. 4, may also be used with an apparatus of the type shown in FIGS. 1–3 as more fully disclosed in my Patent No. 3,211,015.

Figure 9:
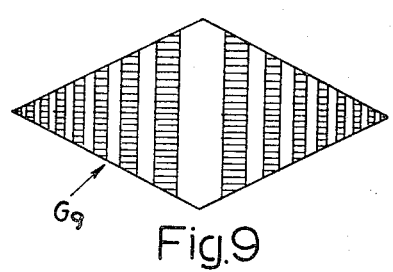
Figure 10:
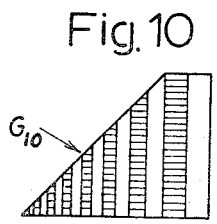

In all the gridlike patterns described in connection with FIGS. 5–15, it will be observed, the width of each series of zones $t_1$, $t_2$ etc. and $r_1$, $r_2$ etc. changes progressively from the ends inwardly, with or without reversal at the center. In FIGS. 6 and 9 this width decreases in a symmetrical manner from the middle toward both ends whereas in the remaining figures there is a narrowing of the zones toward one end and a widening toward the other. The law of variation of the zone width, applicable to any one of these patterns, establishes the width $i_n$ of the $n$th pair of adjoining zones $t_n$, $r_n$ (counting from the widest zone of each series) as a nonlinear function of the distance $x_n$ of the remote boundary of this zone pair from a reference line positioned substantially at the start of the widest pair $t_1$, $r_1$ (or $r_1$, $t_1$, the sequence of the two differently transmissive zones within the pair being immaterial) as will be described hereinafter with reference to FIG. 16.

The pattern G of zones $r_1 \ldots r_N$ and $t_1 \ldots t_N$ in FIG. 16 is substantially identical with that of gate $G_5$ in FIG. 5, apart from the geometrically and optically insignificant fact that the first zone of pattern G on the right is an opaque zone $r_1$ whereas the last zone, on the left, is a transparent zone $t_N$. The outer limit of the first pair $r_1$, $t_1$, i.e. the zonal boundary $B_0$, defines the reference line for the measurement of the zone distances $x_1, x_2 \ldots x_N$. Thus, distance $x_1$ extends from boundary $B_0$ to the remote boundary $B_1$ of the first pair $r_1$, $t_1$, this distance being equal to the width $i_1$ of that pair; distance $x_2$ is measured between $B_0$ and the remote boundary $B_2$ of pair $r_2$, $t_2$ and equals the combined width $i_1+i_2$ of the first two pairs, and so forth. The overall distance $x_N$ corresponds to the spacing of two outer edges $B_0$, $B_N$ of the pattern G. The lines separating the two zones of each pair, designated $b_1$ $b_2$ etc., halve the widths $i_1$, $i_2$ thereof so that the zones $r_1, r_2 \ldots r_N$ are exactly as wide as their companion zones $t_1, t_2 \ldots t_N$, respectively.

In accordance with a specific feature of my invention, the width $i_n$ of any zone pair $r_n$, $t_n$ is derived from the relationship:

$$x_n^2 = nx_1^2 \qquad (1)$$

which gives for the pair of next-higher rank $(n+1)$, $$x_{n+1}^2 = (n+1)x_1^2 \qquad (2)$$

Subtraction of Equation 1 from Equation 2 yields $$x_{n+1}^2 - x_n^2 = x_1^2 \qquad (3)$$

which can be rewritten as $$(x_{n+1}-x_n)(x_{n+1}+x_n) = x_1^2 \qquad (4)$$

For $n \gg 1$, i.e., for relatively large values of $n$, $x_{n+1} \approx x_n$ and $i_{n+1} \approx i_n$ so that, since $i_{n+1} = x_{n+1} - x_n$, we can replace Equation 4 by $$i_n(x_{n+1}) + x_n \approx x_1^2 \qquad (5)$$

and set $$x_{n+1} + x_n \approx 2x_n \qquad (6)$$

whence, upon substitution in Equation 5, $$i_n \cdot 2_n = x_1^2 \quad (7)$$

or $$i_n = x_1^2/2x_n \quad (8)$$

Let $$x_1^2/2 = k \quad (9)$$

($k$ being a constant) and we can write $$i_n = k/x_n \quad (10)$$

which is valid for relatively large values of $n$, as indicated hereinabove, practically for values at least equal to half the total number N of pairs of zones for embodiments where the total width of the gate pattern is on the order of a few centimeters and the number of pairs of zones ranges from several tens to 100 or more. Gates satisfying this last condition (10) provide good results, substantially equivalent to those provided by gates conforming to the more exact relationship (1).

Since the width of an individual zone $r_n$ or $t_n$ is half the width $i_n$ of the zone pair, this individual width $w_n$ will be given in this case by the expression $$w_n = k/2x_n \quad (11)$$

We may also consider all the individual zones $r_1, t_1 \ldots t_N$ as being staggered in width rather than divided into pairs of like width, the individual zone boundaries $b_1, B_1 \ldots b_2, B_2 \ldots B_N$ being then designated $y_1, y_2 (\equiv x_1), y_3, y_4 (\equiv x_2) \ldots y_{2N} (\equiv x_N)$ whence $w_1 = y_1, w_2 = y_2 - y_1, w_n = y_n - y_{n-1}$. Upon substituting $w$ for $i/2$ and $y/2$ for $x$ in the formulas previously given and upon considering that in this case $1 \geq n \geq 2N$, we arrive at the formula $$w_n = k/y_n \quad (10a)$$

or, since $y_n \approx x_n/2$ $$w_n = k/2x_n \quad (10b)$$

when $n$ is sufficiently large.

Equation 10b being identical with Equation 11, it will be apparent that it makes little difference whether the nonlinear law set forth above is applied to the width of the individual zones or of zone pairs.

From Equation 10 it further follows that the width $i_m$ of a zone (or zone pair) of rank $m$ at the center of the sequence, i.e., at distance $x_m' = x_N/2$, will be twice the width of the narrowest zone (or zone pair) of the pattern.

Reference will now be made to FIG. 17 in which the zone width $i$ along the ordinate has been plotted against zone distance $x$ along the abscissa, a segment of an equilateral hyperbola 34 representing the function $ix = k$ expressed by Equation 10. A shaded area in the shape of a crescent or meniscus, centered on the curve 34, is bounded by two other equilateral-hyperbola segments 30 and 31 approaching the hyperbola 34 at points 32 and 33 whose co-ordinates are $x_1, i_1$ and $x_N, i_N$, respectively. This shaded area indicates, in a general manner, the extent to which the value of $i_n$ as a function of $x_n$ may depart from the relationship 10 without materially impairing the sharpness of definition of the adjustment wavelength. These deviations may be expressed in the form $$i_n(x_n \pm d) = k \quad (10')$$

or in the form $$i_n \cdot x_n = k \pm c \quad (10'')$$

where $d$ and $c$ are constants equal to a small fraction of $x_N$ and $k$, respectively.

In FIG. 18 I show a graph illustrating somewhat schematically the variation in throughput, i.e., in the amounts of radiant energy received by, say, the detector $D_1$ of FIG. 3, when a monochromatic flux of given intensity is directed toward the input gate G' and the dispersion system P is rotated past its adjustment position in which the image of gate G' is focused exactly upon gate G''. At the beginning of the scanning displacement of prism P, i.e., at the extreme left along the horizontal axis in FIG. 18, the image of input gate G' misses completely the exit gate G'' so that no light rays are collected by the detector referred to. At point 1 this image begins to register with the output gate so that a progressively increasing amount of radiation reaches the detector $D_1$ as indicated by the upwardly sloping line 2. The rate of increase is approximately constant until, at point 3, there is near coincidence between the projected image of gate G' and the pattern of gate G''. Beyond point 3, the curve rises sharply at 4 toward a peak 5 which it reaches upon precise coincidence of the two patterns. With continuing scanning displacement we encounter the descending branch of the throughput curve which is the mirror image of its ascending branch and consists of a steeply sloping portion 6, ending at a point 7, and a more gently sloping portion 8, ending at a point 9. The slope ratio between curve portions 4 and 2 (or 6 and 8) may be on the order of 100:1 or more.

Meanwhile, the other detector $D_2$ of FIG. 3 receives a radiant flux whose intensity is given by a similar curve, shown in dot-dash lines in FIG. 18, which exhibits gently sloping portions 2', 8' (identical with the gently sloping portions 2, 8) as well as steeply sloping portions 4', 6' extending from points 3' and 7', in the immediate vicinity of points 3 and 7, to a negative peak 5' of ordinate equal to zero. Upon differential combination of the two outputs in the comparator CS of FIG. 3, the sloping portions 2, 2' and 8, 8' cancel whereas the peaks 5 and 5' reinforce each other so as to yield the curve shown schematically in FIG. 19 with substantially horizontal portions 2'', 8'' and a sharp triangular peak 5''. The distance $s$ between the midpoints 4'', 6'' of the flanks of this peak, if measured in terms of the displacement of the projected rays along the output gate G'', corresponds approximately to the smallest zone width $w_N$ of the pattern of that gate; this width may be of the order of 0.01 mm.

FIG. 20 is a diagrammatic illustration of several juxtaposed zonal patterns according to the invention, as seen in section in the spectrum-spread plane of the associated dispersion system. The pattern of output gate G'' (line A) is composed of transparent zones $t_1'' \ldots t_N''$ and opaque/reflecting zones $r_1'' \ldots r_N''$ whereas the image of the input gate G', illustrated in two different positions relative to gate G'' in lines B and C, consists of non-transmitting-zone projections in images $r_1' \ldots r_N'$ and transparent-zone projections $t_1' \ldots t_N'$ coextensive with respective zones of gate G''. The zone images $r_1' \ldots r_N'$ represent regions in which no radiation reaches the output gate G'', the remaining zone images $t_1' \ldots t_N'$ defining the areas in which that gate is illuminated. If the optical position of input gate G' corresponds to that of output gate G'', all the incident radiation traversing the gate G' impinges upon the transparent zones $t_2'' \ldots t_N''$ and none of it, therefore, is received by the opaque zones $r_1'' \ldots r_N''$. When, now, the image of gate G' shifts toward the right, the transparent zones $t_1'' \ldots t_N''$ receive progressively less illumination as the zone images $t_1' \ldots t_N'$ begin to register with the zones $r_1'' \ldots r_N''$; thus, the amount of transluminating flux decreases whereas that of reflected flux increases.

Position B of the image of input gate G' represents a shift from the adjustment position A by a distance $w_N$ equaling the width of the smallest zones $t_N''$ and $r_N''$. In this position the transmission of radiation through the output gate will be almost completely blocked at the left-hand end of the diagram, partly intercepted at its center and nearly unobstructed at the right-hand end; conversely, the amount of reflected flux will be small on the right, intermediate in the middle and relatively large on the left. The extent to which all the transmitting zones $t_1'' \ldots t_N''$ are progressively blocked whereas the reflecting zones $r''_1 \ldots r''_N$ are progressively illuminated, upon a shift from position A to position B, is a linear function of that shift in conformity with the straight slope of the curve portions 3″–5″ and 5″–7″ in FIG. 19. Upon a larger shifting by a distance $w_N$, the system reaches the position C in which the image $t'_m$ of the middle zone of gate G′ registers exactly with zone $r''_m$ of gate G″ which is of the same or nearly the same width $w_m = 2w_N$, this width equaling the total displacement between positions A and C. At the same time there occurs a partial unblocking of the transparent zones on the left and a compensating further blocking of the transparent zones on the right of the pattern so that transmission is virtually cut off at the center while existing to a certain extent at the fringes; on the other hand, reflection is relatively strong at the center and tapers off toward the left end while increasing toward the right end. Consequently, the total luminosity will be almost equal in the two fluxes so that the differential output is zero or nearly zero. Upon a continuing shift, the distribution of bright and dark areas in the transmitted flux and in the reflected flux will change according to a pattern of bright and obscure stripes which have been illustrated schematically in FIG. 21, and which may be termed "moiré fringes", the total luminosity remaining almost equal in the two fluxes and the differential output remaining zero or nearly zero.

A more realistic representation of the output signal, as registered by the indicator IS in FIG. 3, is the curve $S_1$ in FIG. 22 which has a peak defined by two steeply sloping portions 14, 16 converging at a point 15, the spacing of the base points 13, 17 of this peak being a measure for the selectivity of the apparatus. Curve $S_1$ is produced with a pair of rectangular gates of the type shown at $G_5$ in FIG. 5 and, it will be noted, exhibits several secondary peaks 11, 12 and 18, 19 alongside the principal peak 14–16. The negative peaks 12, 18 indicate a preponderance of the reflected flux over the transmitted one in the case of optically identical patterns (or vice versa in the case of complementary patterns). With triangular or rhomboidal outlines, as shown at $G_7$, $G_8$, $G_9$ in FIGS. 7–9, the resultant signal will be a curve $S_2$ as illustrated in dotted lines in FIG. 22, the first secondary peaks 22, 29 of this curve being considerably flatter than the corresponding peaks 11, 19 of curve $S_1$ and having an amplitude of only about 4% of that of point 15; the more remote peaks of curve $S_2$ all have amplitudes less than 1% of the amplitude of the principal peak. It will be noted, on the other hand, that the base of the peak of curve $S_2$ is somewhat broadened, with reference to curve $S_1$, so that the selectivity of the apparatus is slightly decreased. With a trapezoidal pattern, as illustrated at $G_{10}$ in FIG. 10, the signal will be a curve $S_3$, shown in dot-dash lines in FIG. 22, with an intermediate base width and smaller amplitudes in the region of the secondary peaks 22, 29 of curve $S_2$.

In FIG. 23 I have shown a spectrometer, generally similar to the apparatus of FIGS. 1–3, whose input element comprises a gate G′ with the aforedescribed zonal pattern alongside a wholly transparent auxiliary gate or window $G'_0$, the rectangular area of this window being one-fourth the area of gate G′ so as to be equal to half the total surface area of the transparent zones of the pattern thereof; the minor sides of the rectangle, aligned with those of gate G′, are perpendicular to the spectrum-spread direction. The output element, analogously, consists of a gate G″ with a pattern geometrically similar to that of gate G′ and, in addition, of an auxiliary gate $G''_0$ bearing the same relationship to gate G″ as does gate $G'_0$ to gate G′. The zones of gate G″ corresponding to the transparent zones of gate G′ may be either transparent or reflecting; similarly, gate $G''_0$ may be wholly transparent (i.e., a widow) or wholly reflecting (i.e., a mirror). In any event, in the adjustment position of the system, the output energy directed by gate G″ to the detector $D_3$ will be a maximum and will be double the amount of flux which reaches an auxiliary detector $D_0$ from gate $G''_0$.

In FIG. 24 I have shown at $F_0$ a triangular curve which represents the flux impinging upon detector $D_0$ by way of gates $G'_0$ and $G''_0$, this curve extending between points 1 and 9 which, as in FIG. 18, denote the positions of incipient and terminal overlapping between the input-gate image and the output gate; the apex of the triangle represents, of course, the position of precise coincidence, i.e., the adjustment position of the system. Also shown in FIG. 24 is a curve F which represents the radiation flux received by detector D via gates G′ and G″ and which will be recognized as corresponding to the curve 1–9 of FIG. 18. Thus, the peak of curve F has an altitude which is twice that of the triangular curve $F_0$ so that, upon differential combination of the outputs of detectors D and $D_0$, there results a curve S which is similar in shape to the idealized curve in FIG. 19 but whose peak amplitude is only half the peak amplitude of the latter curve.

In FIG. 25 I have shown a true reproduction of a gridlike zonal pattern which conforms to the hyperbolic law of distribution described in conjunction with FIGS. 16 and 17.

It will thus be seen that I have disclosed a distinct type of zonal pattern whose zone distribution follows a non-linear law, generally as defined by the hyperbolic formulas previously stated, and which may be given a variety of outlines, this pattern being suitable for use in an input gate or output gate of a spectrometric apparatus comprising a dispersion system. Naturally, the invention is not limited to the specific configurations herein disclosed but may be modified, to an extent not involving repetition of the pattern in the aforementioned spectrum-spread plane, within the scope of the claims hereunto appended.

I claim:

1. A device adapted to be utilized as a radiation gate in a spectrometric apparatus having a pair of such gates disposed at the input and at the output, respectively, of a projection system which includes dispersion means adjustable to cast upon the output gate the image of the input gate as projected with a predetermined wavelength of incident radiation; said device comprising a substantially plane plate provided with a first multiplicity of zones and with a second multiplicity of zones alternately interleaved with each other, the total surface area of said first multiplicity being substantially equal to that of said second multiplicity, the zones of said first multiplicity having a transmissivity for incident radiation differing from that of the zones of said second multiplicity, the pattern formed by the zones being so related to a family of imaginary lines parallel to a predetermined direction that the boundaries between adjacent zones subdivide each of said lines into segments varying progressively in length from the ends of said lines inwardly.

2. A device as defined in claim 1 wherein the zones of said first multiplicity are relatively transparent whereas the zones of said second multiplicity are relatively opaque to incident radiation.

3. A device as defined in claim 1 wherein the zones of said first multiplicity reflect said incident radiation, the zones of said second multiplicity being substantially nonreflective.

4. A device adapted to be utilized as a radiation gate in a spectrometric apparatus having a pair of such gates disposed at the input and at the output, respectively, of a projection system which includes dispersion means adjustable to cast upon the output gate the image of the input gate as projected with a predetermined wavelength of incident radiation; said device comprising a substantially plane plate provided with a first multiplicity of zones and with a second multiplicity of zones alternately interleaved with each other, the zones of said first multiplicity having a transmissivity for incident radiation differing from that of the zones of said second multiplicity, the width of the zones of each multiplicity varying in a nonlinear manner defining a pattern that is nonrepetitive in the direction of succession of said zones.

5. A device adapted to be utilized as a radiation gate in a spectrometric apparatus having a pair of such gates disposed at the input and at the output, respectively, of a projection system which includes dispersion means adjustable to cast upon the output gate the image of the input gate as projected with a predetermined wavelength of incident radiation; said device comprising a substantially plane plate provided with a first multiplicity of zones and with a second multiplicity of zones alternately interleaved with each other in at least one row, the zones of said first multiplicity having a transmissivity for incident radiation differing from that of the zones of said second multiplicity, the width of the zones of each multiplicity varying progressively within said row in a nonlinear manner defining a pattern that is nonrepetitive in the direction of succession of said zones.

6. A device adapted to be utilized as a radiation gate in a spectrometric apparatus having a pair of such gates disposed at the input and at the output, respectively, of a projection system which includes dispersion means adjustable to cast upon the output gate the image of the input gate as projected with a predetermined wavelength of incident radiation; said device comprising a substantially plane plate provided with a first multiplicity of zones and with a second multiplicity of zones alternately interleaved with each other, the zones of said first multiplicity having a transmissivity for incident radiation differing from that of the zones of said second multiplicity, the width of the zones of each of said multiplicities varying in a monotonous and nonlinear manner as a function of the distance of the respective zone from one of the edges of the plate and defining a pattern that is nonrepetitive in the direction of succession of said zones, any one zone being juxtaposed with an adjacent zone of different transmissivity being substantially the same width.

7. A device as defined in claim 6, further comprising a region on said plate separate from said pattern and of an area equaling substantially half the total area of said first multiplicity of zones, said region having substantially the same transmissivity as the zones of said first multiplicity, said pattern and said region having aligned boundaries transverse to said direction of succession.

8. A device adapted to be utilized as a radiation gate in a spectrometric apparatus having a pair of such gates disposed at the input and at the output, respectively, of a projection system which includes dispersion means adjustable to cast upon the output gate the image of the input gate as projected with a predetermined wavelength of incident radiation; said device comprising a substantially plane plate provided with a first multiplicity of zones and with a second multiplicity of zones alternately interleaved with each other in at least one row, the zones of said first multiplicity having a transmissivity for incident radiation differing from that of the zones of said second multiplicity, the width of the zones of each multiplicity varying progressively within said row from the center of the row outwardly in a nonlinear manner defining a pattern that is nonrepetitive in the direction of succession of said zones.

9. A device adapted to be utilized as a radiation gate in a spectrometric apparatus having a pair of such gates disposed at the input and at the output, respectively, of a projection system which includes dispersion means adjustable to cast upon the output gate the image of the input gate as projected with a predetermined wavelength of incident radiation; said device comprising a substantially plane plate provided with a first multiplicity of zones and with a second multiplicity of zones alternately interleaved with each other in at least one row parallel to an edge of the plate, the zones of said first multiplicity having a transmissivity for incident radiation differing from that of the zones of said second multiplicity, the total surface area of the zones of said first multiplicity being substantially equal to the total surface of the zones of said second multiplicity, the width of the zones of both multiplicities varying progressively in a nonlinear manner and substantially identically with each other within said row from the ends of the row inwardly and defining a pattern that is nonrepetitive in the direction of succession of said zones, any one zone being paired with an adjacent zone of different transmissivity having substantially the same width.

10. A device as defined in claim 9 wherein the widest and the narrowest zones of each multiplicity have a width ratio on the order of 100:1.

11. A device as defined in claim 9 wherein the width $i_n$ of the $n^{th}$ pair of adjacent zones within the row, counted from the zone pair of greatest width of the row, is related to the distance $x_n$ of said $n^{th}$ pair of zones from said zone pair of greatest width $i_1$ substantially by the Formula $i_n(x_n \pm d) = k$, $k$ and $d$ being constants and $n$ being an integer between 1 and N where N is the total number of zone pairs from said zone pair of greatest width to a zone pair of smallest width, $d$ being a small fraction of the maximum distance $x_N$.

12. A device as defined in claim 11 wherein the magnitude of N is at least equal to approximately 100.

13. A device as defined in claim 11 wherein the square root of $2k$ is substantially equal to said greatest width $i_1$.

14. A device as defined in claim 11 wherein the width of each zone in said pair of smallest width is on the order of 0.01 millimeter.

15. A device as defined in claim 9 wherein the width $i_n$ of the $n^{th}$ pair of adjacent zones within the row, counted from the zone pair of greatest width of the row, is related to the distance $x_n$ of said $n^{th}$ pair of zones from said zone pair of greatest width $i_1$ substantially by the formula $i_n \cdot x_n = k \pm c$, $k$ and $c$ being constants and $n$ being an integer between 1 and N where N is the total number of zone pairs from the zone pair of greatest width to the zone pair of smallest width, $c$ being a small fraction of $k$.

16. A device as defined in claim 15 wherein the width of the zones of the pair located substantially halfway between the zone pair of greatest width and the zone pair of smallest width is substantially equal to twice the width of the zones of said zone pair of smallest width.

17. A device as defined in claim 9 wherein said row is bounded by parallel longitudinal sides.

18. A device as defined in claim 9 wherein said row is bounded by longitudinal sides converging in the direction of a zone of minimum width.

19. A device adapted to be utilized as a radiation gate in a spectrometric apparatus having a pair of such gates disposed at the input and at the output, respectively, of a projection system which includes dispersion means adjustable to cast upon the output gate the image of the input gate as projected with a predetermined wavelength of incident radiation; said device comprising a substantially plane plate provided with a first multiplicity of zones and with a second multiplicity of zones alternately interleaved with each other in a plurality of adjacent rows, the zones of said first multiplicity having a transmissivity for incident radiation differing from that of the zones of said second multiplicity, the width of the zones of each multiplicity varying within each row according to a generally hyperbolic law in a nonlinear manner defining a pattern different for all said rows, said pattern being nonrepetitive in the direction of succession of said zones.

20. A device adapted to be utilized as a radiation gate in a spectrometric apparatus having a pair of such gates disposed at the input and at the output, respectively, of a projection system which includes dispersion means adjustable to cast upon the output gate the image of the input gate as projected with a predetermined wavelength of incident radiation; said device comprising a substantially plane plate provided with a first multiplicity of zones and with a second multiplicity of zones alternately interleaved with each other in a plurality of adjacent rows, the zones of said first multiplicity having a transmissivity for incident radiation differing from that of the zones of said second multiplicity, the total surface area of the zones of said first multiplicity being substantially equal to the total surface area of said second multiplicity, the width of the zones of both multiplicities varying progressively and substantially identically within each row from the center of the row outwardly in a nonlinear manner defining a pattern being nonrepetitive in the direction of succession of said zones, adjacent zones of different transmissivity within each row having substantially the same width.

21. A device as defined in claim 20 wherein each row is bounded by two sides cutting across the zones thereof and converging toward a zone of minimum width.

22. A device as defined in claim 21 wherein a pair of adjoining rows define a rectangle, the common side of said adjoining rows extending along a diagonal of the rectangle.

23. A device as defined in claim 21 wherein the zones of each row are arcuately curved about a common center toward which the sides thereof converge, said adjoining rows defining at least a segment of a circular ring.

24. A device as defined in claim 20 wherein each row is bounded by two sides cutting across the zones thereof and converging toward a zone of minimum width, adjacent rows having one of said converging sides in common.

25. A device as defined in claim 20 wherein the narrowest zone of one row has a width substantially equal to that of the widest zone of an adjoining row.

References Cited

UNITED STATES PATENTS 3,311,015  3/1967  Girard.

FOREIGN PATENTS 1,249,247  11/1960  France.

OTHER REFERENCES

Girard: "Spectromètre à Grille," Applied Optics, vol. 2, No. 1, January 1963, pp. 79–87.

JEWELL H. PEDERSEN, *Primary Examiner.*

F. L. EVANS, *Assistant Examiner.*

U.S. Cl. X.R.

350—205; 356—71, 96, 88